UNITED STATES PATENT OFFICE.

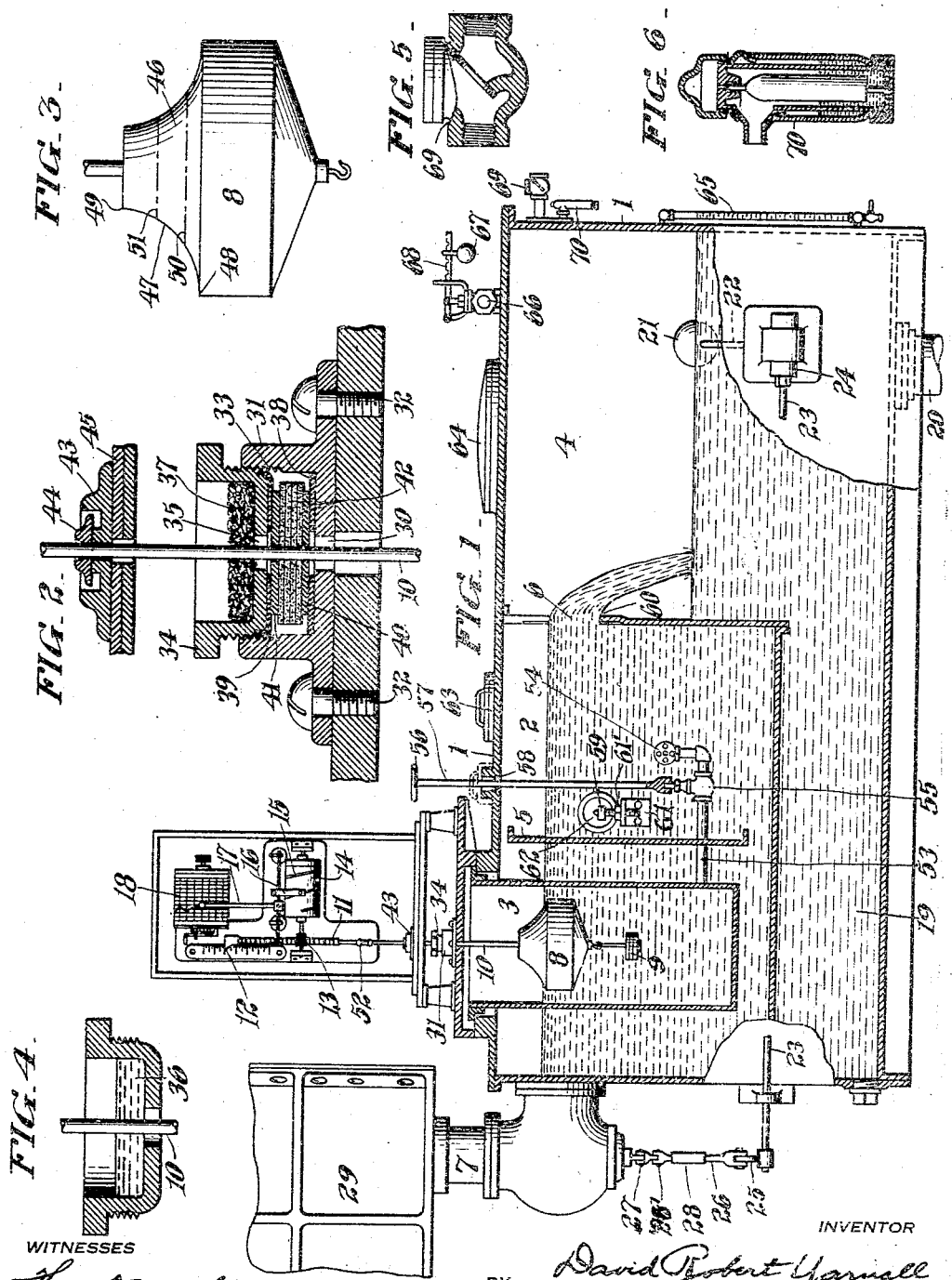

DAVID ROBERT YARNALL, OF PHILADELPHIA, PENNSYLVANIA, ASSIGNOR TO YARNALL-WARING COMPANY, OF PHILADELPHIA, PENNSYLVANIA, A CORPORATION OF PENNSYLVANIA.

AUTOMATIC METER CONTROL.

1,143,344.   Specification of Letters Patent.   Patented June 15, 1915.

Original application filed April 1, 1912, Serial No. 687,630. Divided and this application filed November 8, 1912. Serial No. 730,124.

*To all whom it may concern:*

Be it known that I, DAVID ROBERT YARNALL, a citizen of the United States, residing at 316 Preston street, Philadelphia, in the county of Philadelphia and State of Pennsylvania, have invented a certain new and useful Automatic Meter Control, of which the following is a specification.

The purpose of my invention is to conserve space and improve the construction in fluid meters, particularly of the weir type.

A further purpose of my invention is to reduce friction upon the float rod in operation.

A further purpose of my invention is to secure oil seal and lubrication for a float rod gland whether subjected to pressure conditions or not.

A further purpose of my invention is to so shape the float as to automatically correct for variation in temperature of fluid metered by relatively reducing the volume of float additionally submerged at one temperature and not submerged at another to offset the increase of volume of the constantly submerged part of the float and the increased length of the rest of the float.

A further purpose of my invention is to provide adjustment for the rate of compensation for fluid temperature variation.

A further purpose of my invention is to accommodate part of the storage of water which has passed over a weir in the space beneath the weir chamber to provide additional safeguard against drainage of the system by pump withdrawal.

A further purpose of my invention is to space-insulate a recorder from a fluid meter tank and to protect against vapor or other gaseous leakage from the tank to the recorder case.

A further purpose of my invention is to provide a self-alining gland for a float rod, permitting the rod and float automatically to reach an accurate vertical position as free as possible from lateral strain upon the rod and gland.

I have preferred to illustrate my invention by one form thereof which I have found to be simple, efficient and relatively inexpensive and which well illustrates the principles of my invention.

Figure 1 is a vertical longitudinal section of a preferred construction embodying my invention. Fig. 2 is an enlarged section of a portion of the structure in Fig. 1 showing the gland preferred by me. Fig. 3 is a side elevation of the form of float shown in Fig. 1. Fig. 4 is a broken vertical section of a modification of one of the glands in Fig. 2. Figs. 5 and 6 are sectional views of valves used by me.

Like numerals of reference indicate corresponding parts in the drawings.

This application is a division of my application for fluid meter, filed April 1, 1912, Serial No. 687,630.

In weir construction there has been difficulty in providing sufficient storage of the water after it has been measured to protect against unusual drains by the pump or temporary stoppages of water flow from a heater, condenser or the like, to which the meter is connected. Space limits have prohibited increased floor area for the tanks. I have extended the volume of storage space for the water metered without enlarging the floor area required and while maintaining pressure and temperature conditions and securing the equalizing-pool effect of increased water storage. I do this by extending the chamber below the weir, which I will call the storage chamber. I find that the extended area of the meter tank in cross section gives an advantageous result in the regulation of the inlet flow from the catch basin, since there is less rapid fluctuation and the control obtained from the catch basin is more uniform. The resultant curve of operation is smoother and more desirable without losing effective control of the inlet.

The pressure-tight tank 1 is divided in the form shown into intercommunicating chambers 2, 3. 4, respectively, the weir chamber, the float chamber and the storage chamber. Within the weir chamber is placed a baffle plate 5 to prevent surging of the water at the point 6 where it passes over the weir by reason of the inlet water supply at 7 from the feed water heater, condenser or other suitable source which may or may not be under steam pressure. The float chamber 3 contains float 8 shown as weighted at 9 and communicating its movement through rod 10 to rack 11. The rack carries an indicator 12 and operates a gear 13 by which drum 14 is rotated. The guide 15 on the drum is so formed as to move the arm 16 and, hence, the recording finger 17 axially of the drum a distance proportionate to the increase or decrease of the flow of water over the weir so that the record upon the cylinder 18 may be integrated by planimeter methods. This recording mechanism is the well known Lea mechanism. I have extended the storage chamber beneath the chamber 2 as at 19 so as to give any desired storage space for this water which has been measured, at the expense merely of lifting the tank 2 and without enlarging the floor space required.

In order to control the inlet water as far as may be possible, to make its flow proportionate to the rate of withdrawal through pipe 20 by the pump I provide a float 21 upon lever arm 22 connected to rod 23 which operates through stuffing box 24 so as to translate movement of the float into rod rotation without losing the pressure conditions within the tank. The rod 23 is provided at any desired point with a lever arm 25 which controls a valve in the intake 7 by means of rods 26 and 26' and arm 27. Any suitable turn buckle 28 provides for adjustment of the relative positions of these parts to set the valve for any height of storage water desired. Pipe 7 is shown as leading from an open feed water heater 29.

It is difficult to construct a float accurately enough for its center of rotation in the water or for its center of flotation to lie exactly within the axis of the float rod. For this, as well as other reasons, the rod connecting with the float frequently presses against the gland by which it is packed at the point of leaving a pressure tank and this binding takes place notwithstanding great care in the placing of the gland. In order to permit the float to set itself and, so far as possible, remain in the position set with the least lateral binding effect of the rod upon the gland, I provide a gland packing which is laterally movable in any direction within a plane perpendicular to the rod and I seal this movable gland packing with oil to gain several advantages, of oil seal therefrom, lubrication of the rod where it passes through the gland packing, and lubrication and filling of the packing material within the gland box.

In the form shown, the rod 10 passes freely through the space 30 in a box 31, retained in any suitable manner as by screws 32, and preferably internally threaded at 33 to provide for adjustment of the cup 34 therewith. The cup performs two functions; bringing pressure upon the packing, and holding the sealing and, preferably, lubricating liquid. The opening 35 in the cup, like that at 30 in the box, is also considerably larger than the rod and the cup is preferably oil-filled with a heavy oil as at 36. I have obtained the best results with cylinder oil and have found that cotton waste in the oil, as at 37, assists in preventing evaporation of the oil and acts as a wick to maintain lubrication of the rod for a greater length of time than would be the case with oil alone. In Fig. 4 I have shown oil without the waste.

In the best form of my invention I place rubber packing 38 and 39 within box 31 and against the bottom of the box and under surface of the cap 34, respectively, placing plates 40 and 41 next to these rubber sheets and filling the space between these two plates with any suitable number of sheets, here shown as disks of felt or similar material 42, soaked in a mixture of graphite and oil. Other arrangements of the parts, materials and impregnation would, obviously, secure a part, at least, of the benefit of my invention. The pressure of the cap upon the content within the box 31 may be adjusted in each different application of my invention to correspond to the permissible friction against lateral movement of the sheets or disks, the character of oil seal used and other conditions determined by the exact design used and the judgment of the engineer. The body of oil within the cap itself constitutes a fluid seal and maintains the desired saturation of the disks of felt or other fibrous material and their proper lubrication against the plates and against the rod. Ordinarily the friction would be less between the plates and the rubber disks than between the plates and the felt, with the result that, if the gland be not in proper alinement with the rod, there will be movement of the entire group between and including the plates until this adjustment has been secured. I have obtained excellent results with this construction under different pressure conditions within the tank. I have tested it with a vacuum, such as is present when the meter is connected with a condenser or vacuum pans, and the pressure above atmospheric pressure existent when the meter was connected with an open feed water heater.

In order to avoid all possibility of vapor passage from the meter into the recorder case, even when there is pressure within the meter, due, for example, to its connection with an open feed water heater, I prefer to set the recorder case up above the gland described or any other gland which may be used to seal the rod 10, providing relatively free air space between the gland and the bottom of the recorder case so that any vapor which might leak through the gland used will be dissipated in the atmosphere. In addition to this spacing I prefer to provide a second gland of any suitable form in the bottom of the recorder case. I have illustrated a well known type of antivapor gland for this purpose comprising a base plate 43 and movable cap 44 resting upon the bottom 43 of the case. I have shown the gland as resting upon the bottom 45 of the recorder plate. In the case of a gravity meter, as, for example, a V-notch weir meter, when the temperature of the water increases, the volume increases, though not proportionately. The additional height of water causes flow of a corresponding additional sheet of water through the weir, in this case at the widest part of the weir in use, the top of the wedge. The water flows through the opening in greater volume but is lighter. The float would ordinarily rise, though more deeply immersed. The surface of the water is at a higher level and the float's own volume would be increased. The length of its connections would also be increased. All of these factors make the reading in excess of the actual flow. My invention corrects for this error.

In order to make the float compensate automatically for temperature changes in the water metered I have constructed the upper part of the float of conoidal form and have adjusted the depth of flotation of the float by means of removable weights 9 so as to operate normally upon the desired part of the surface 46 of the upper part of the float. This correction was previously made by means of tables. The compensation for reduction in temperature by reduction in submergence is, of course, likewise automatic.

The mathematical determination of the conformation of the float is complicated by a number of factors, including the consideration of the shape of the portion of the float continuously submerged, the height of the float and rod affected by the temperature changes, and the fact that the increase of volume of water with increase of temperature, according to the best determinations, does not follow a uniform law, but varies considerably in different temperature ranges. Since the shape can be determined experimentally within quite as close an approximation as the mechanic would be able to make it in metal or pattern if given the mathematical equation, mathematical consideration of this question has been omitted here and, instead, I shall point out a practical method by which I have obtained excellent results. I form the upper part of the float of approximately the shape indicated in the drawings, usually having curved longitudinal section 47 and varying between tangency to the horizontal and vertical at 48 and 49 respectively. I tentatively immerse the float to a desired level indicated by dotted lines at 50 by means of suitable weights, at the lower of the two temperatures representing the substantial range of temperature to which the float is to be subjected. I then increase the temperature to the higher of the two temperatures, immersing to line 51. If there be any upward movement of the rod 10 as a result of the change, this indicates that I have selected my range upon a part of the curve 47 too high up on the curve, i. e., too near the end at 49 of this curve, and that the float should not be immersed so deeply for the initial temperature. If there be downward movement of the rod 10, this indicates that too much of the more nearly horizontal part of the curve, that near the end 48, has been used for the range of temperature and that the float should be immersed initially to a greater extent by addition to the weights 9. The absence of any difference in position of the rod 10 at the two temperatures indicates that the selection of the part of the curve for this range has been correct and that the proportions of the float are accurate for the two limits of the range of temperature. The float can now be tested at intermediate temperatures.

If there be upward movement of the rod 10 at an intermediate temperature, the contour between the limits is not concave enough and should be increased in curvature; while downward movement of the rod 10 under the same conditions indicates that the contour tentatively selected is concaved too much between the limits. In this way any desired number of determinations can be made and the form of curve can be determined with as much accuracy as the detection of movement of the rod 10 will permit. Where movement of the rod 10 with change of temperature cannot be detected correction for temperature variation may ordinarily be neglected. If no portion of the curve can be found which will give the proportions required at the limits of temperature there is a disproportion between the size of the continuously immersed part of the float as compared with the reduction available at the neck and the body of the float can be reduced or the reduction can be increased as may seem best in the case in point. In order to permit setting of the zero point of cylinder 14 and the adjustment of the depth of flotation for any desired conditions of service without changing this zero point, I provide any suitable coupling 52 between the rod 10 and the rack 11. I have connected the tank 3 with the tank 2 by means of a pipe 53 terminating in a screened end 54 and containing a valve 55 which is controlled from the outside by wheel 56 through rod 57 sealed by gland 58. The upper part of the chamber 3 is opened freely to the surface pressure or vacuum conditions of chambers 2 and 4 since the spaces at the top between these chambers are not closed. To assist in initial setting of the zero point of cylinder 14 I place a pin 59 on a level with the bottom of the weir at 60, making the point adjustable for the purpose of exact setting by forming it as a screw within bracket 61, locked therein by nut 61'. For convenience in adjusting the instrument to zero while the meter is under pressure or a vacuum, peep holes 62 in line with the top of the pin are provided. One hole only shows in the illustration. So that various parts of the tank may be freely accessible I provide hand hole 63 and man hole 64. I determine the height of water in the chamber below the weir by gage glass 65.

Where pressure is desired above that of the atmosphere, as will occur where open feed water heaters afford the supply and the pressure transmitted therefrom is to be maintained in a meter to gain the benefit of the increased temperature and head of the water, I provide for protection against excessive pressures by any suitable safety valve 66, which I have shown as controlled by weight 67 adjustable upon the rod 68. I avoid conditions of vacuum by a simple check or flap valve 69 shown in Fig. 5, in which pressure less than atmospheric pressure will permit the opening of the valve due to the greater exterior (atmospheric) pressure. I also avoid the excessive accumulation of air within the meter chambers by thermostatic valve 70 open at lower temperatures but closed by reason of the increased temperature when the temperature exceeds 212°, the temperature at which pressures above the atmospheric pressure begin. Where vacuum conditions are to be met by the meter I provide against excessive pressures within the chambers by the same character of check or flap valve as shown at 69 except that I turn it the opposite way. The safety valve and thermostatic valve are not required for this use.

It will be evident that my float may be made independent of the temperature of the fluid within which it is floated, automatically compensating therefor to maintain the same actual height within the fluid regardless of the temperature and that the compensation may be adjusted to variant conditions of temperature range and fluid measured. The form of the curve may be suited to the conditions of use with great nicety. My increased storage for the water below the weir equalizes the pressures for the pumps, providing a pool or storage chamber for that purpose. My compensating float, capable of use in other arts and other meters, as, for example, in Venturi meters and Pitot tubes, as well as in weir meters, is highly useful here. It avoids necessity for correction of the readings, as heretofore, by a table, and the conformation of the float can be experimentally determined with the same degree of accuracy as the experimental determination of the correction required. My weir meter is protected against air pressure as well as vacuum, insuring a minimum of air present after the boiling temperature has been reached and avoiding feeding of air to the pump, except such slight amount as may be entrained by the feed water in its entry after boiling temperature has been exceeded, thus duplicating to the pump in this regard the conditions of feed water supplied to the meter.

Having thus described my invention, what I claim as new and desire to secure by Letters Patent is:—

1. A recording meter float having that part of its upper surface which is variantly submerged shaped to compensate for changes in fluid density due to temperature changes.

2. A recording meter float having the part which is variantly submerged at different temperatures of progressively reduced cross section toward the top to compensate for changes of density of fluid gaged at different temperatures by the variation in the displacement of fluid by the float.

3. A recording meter float having that part of its upper surface which is variantly submerged at different temperatures concaved to compensate for changes of density of fluid gaged at different temperatures by the variation in the displacement by the float.

4. A recording meter float having the upper part which is variantly submerged at different temperatures of concaved conoidal surface to compensate for changes of density of fluid gaged by variation in the displacement of the fluid.

5. A recording meter float having that part of its upper surface which is variantly submerged, of concaved conoidal shape and means for normally immersing the float to a point upon said conoidal surface.

6. A recording meter float having that part of its upper surface which is variantly submerged, of concaved conoidal shape and means for varying the depth of flotation of the float.

7. In a device of the character stated, a fluid meter, a float rod therein, an antivapor gland for the float rod and a recorder case spaced from the gland and into which said rod passes, the rod being exposed to the atmosphere between the antivapor gland and the case.

8. In a device of the character stated, a fluid meter tank, a recorder case spaced therefrom, a float rod within the tank and an antivapor gland for said rod permitting exposure of the rod to the atmosphere between the gland and the case.

9. In a device of the character stated, a meter tank, a recorder case thereabove spaced therefrom, and a float rod within the meter, passing out therefrom, open to the atmosphere between and passing into the recorder case.

DAVID ROBERT YARNALL.

Witnesses:
WM. STEELL JACKSON,
HELEN I. KAUFFMAN.